United States Patent Office 3,032,507
Patented May 1, 1962

3,032,507
CATIONIC BITUMINOUS EMULSIONS
James R. Wright, El Cerrito, Calif., assignor to California Research Corporation, San Francisco, Calif., a corporation of Delaware
No Drawing. Filed Sept. 2, 1959, Ser. No. 837,599
6 Claims. (Cl. 252—311.5)

This invention relates to the preparation of improved cationic oil-in-water type bituminous emulsions. More specifically, it relates to the preparation of cationic oil-in-water emulsified asphalts suitable for use in the construction and repair of road and pavement surfaces, and in the seal coat treatments of various asphalt pavements.

In recent years, cationic oil-in-water bituminous emulsions have made their appearance on the market where heretofore anionic oil-in-water bituminous emulsions have been considered to be the only kind suitable for road paving work and providing economically attractive returns for the applicator. The cationic emulsions possess a number of advantages, among which the principal one is the possibility of employing these emulsions on electro-negative aggregates, such as siliceous gravels, sandstones, and the like.

Considerable material appeared in the literature describing the various properties of cationic bituminous emulsions and the different applications of these emulsions for all sorts of pavements, either as seal coats, or as slurries mixed with fine siliceous aggregates (crusher dust and/or sand) for so-called slurry seal coat work, or yet in mixtures with coarse aggregates in the construction and resurfacing of pavements.

A well-known class of effective cationic surface-active materials suitable as the emulsifying agents for the emulsification of bitumen in water is formed by quaternary ammonium salts of the general formula $$\left[ R_1-\underset{\underset{R_2}{|}}{\overset{\overset{R_4}{|}}{N}}-R_3 \right]^+ X^-$$

In this formula, $R_1$ is a long alkyl chain of at least 12 carbon atoms, $R_2$, $R_3$ and $R_4$ being lower molecular weight alkyl radicals, the presence of which is sufficient to impart the oil solubility and emulsifying properties to the salt material, and X being an anion, preferably a halogen, such as chlorine or bromine. An example of such halide salts of quaternary ammonium bases is, for instance, cetyl trimethyl ammonium bromide. Other similarly effective cation-active emulsifying agents for the preparation of emulsions of bitumen in water are salts of quaternary heterocyclic N-bases in which one valence on the nitrogen atom is a long-chain alkyl group of at least 12 carbon atoms and the other valences are joined to carbon atoms in a cyclic configuration. Examples of these emulsifying agents are cetyl pyridinium chloride, cetyl quinolinium bromide, and various 1,2-substituted imidazolinium halides.

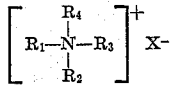

However, the road-building contractors and other applicators of oil-in-water type cationic bituminous emulsions prepared with the aid of the aforementioned cationic emulsifiers soon discovered that, in actual practice, successful application of these emulsions requires the exercise of careful control and maximum care (with respect to the exact proportioning of ingredients, maintenance of pH, etc.), owing to the extremely delicate balance of the emulsion stability. Apparently, due to the particular nature of the aforementioned emulsifying salts of quaternary N-bases, the resulting cationic emulsions are rather unstable and, therefore, tend to break down before being applied to (contacted with) the aggregate, and are more than likely to break down altogether too quickly upon actual contact with the aggregate. The result is inability of the emulsion to provide an adequately strong bond with the surface of the aggregate and consequently, an imperfect unsatisfactory treatment of the road surface, together with a substantial economic loss of the bituminous binder component of the emulsion by reason of run-off.

In order to parry this tendency of cationic emulsions to break down too soon, the manufacturer is forced to resort to re-running the emulsion through the colloid mill, but this, of course, complicates the process of manufacturing and increases the costs.

This inadequate stability of cationic emulsions, prepared with the aid of the aforementioned halide salts of quaternary nitrogen bases as emulsifiers therefor, represents an even greater drawback when the emulsion is to be applied on the road surface as a mixture with the aggregate, particularly with the so-called "coarse aggregate."

In these applications, the aggregate and the emulsion are mixed in place, at the very site of the job, in a suitable piece of equipment, which usually consists of a mixer, such as a pugmill, provided with a distributing device for spreading the resulting mixture of the aggregate and emulsion onto the road surface to be constructed or repaired. Particularly efficient operation is achieved with the so-called "Moto-Paver" type of equipment, described in Bulletin MP–49 published by Hetherington and Berner, Inc. of Indianapolis, Indiana.

Because the stability of cationic emulsions is so easily disturbed, the time for mixing it with the aggregate is, perforce, very short, usually a matter from 1 to 2 minutes at the most to assure a satisfactory coating of the aggregate by the bitumen. On the other hand, the emulsion is usually not stable enough to remain intact after coming into contact with the aggregate in the mixing mill for more than 1–2 minutes. If the mixing is prolonged after the emulsion began to break down, the bituminous film will tend to strip off the aggregate upon being distributed onto the road surface. Here again, the quality of the resulting pavement will be more than often unsatisfactory, because the emulsion fails to adhere to the aggregate, and, as a consequence, considerable quantity of bitumen is lost by run-off.

The importance of being able to extend the time of mixing about 1½ to 2 minutes, delaying thereby the emulsion's breakdown, to obtain a stronger bond between the bitumen and the aggregate, and to prevent an unduly high loss of the bitumen through run-off, may not be too evident to a non-initiate; but to those engaged in the paving work, the ability to do so would represent a significant advance over the art. Moreover, elimination of the re-milling step in the preparation of emulsions is a definite advantage for their manufacturer.

It has now been found that improved oil-in-water cationic bituminous emulsions of improved quality and texture, capable of remaining stable on contact with the aggregate for a short but sufficient period to achieve the desired bond of the bitumen film therewith, and not being subject to excessive run-off, can be produced by the emulsification of bitumen in water with the aid of the aforedescribed cation-active halide salts of nitrogen bases in the presence of a member of a particular group of compounds, which acts to improve the quality of the emulsion and to extend the time during which the emulsion may stay in contact with the aggregate without immediately breaking down.

These latter additives are selected from the group made up of certain effective high molecular weight unsaturated monohydric alcohols, namely, sterols, such as cholesterol and its homologs, e.g., sitosterols, ergosterol and the like; $C_{16}$–$C_{20}$ alkenyl alcohols (alkenols), such as oleyl alcohol or elaidyl alcohol, and $C_{16}$–$C_{20}$ alkadienyl alcohols (alkadienols), such as linoleyl alcohol.

As indicated already, among the cation-active materials suitable as the emulsifying agents for the production of oil-in-water type cationic bituminous emulsions, e.g., road-paving cationic asphalt-in-water emulsions, also designated in the trade as "acidic emulsified asphalts," an effective class is formed by halide salts of organic nitrogen bases, characterized by the presence of the group

in their cation portion and by the presence of a halogen in their anion portion. In the aforementioned group, the symbol R designates a long-chain acyclic saturated radical of at least 12 carbon atoms, preferably a straight-chain radical, while the three remaining valences of the nitrogen atom can either carry (1) short alkyl radicals or (2) can be joined to carbon atoms in a cyclic configuration. Case (1) corresponds to the group of tetra-substituted quaternary ammonium halide salts; case (2) is representative of halide salts of heterocyclic nitrogen bases, such as alkyl pyridinium, alkyl quinolinium, alkyl isoquinolinium, and alkyl imidazolinium halides. Typical quaternary ammonium halide salts suitable as emulsifiers for the preparation of bituminous (asphalt) cationic emulsions in accordance with the invention are: cetyl trimethyl ammonium bromide, cetyl dimethyl ethyl ammonium bromide, "tallow" trimethyl ammonium chloride (the term "tallow" referring to the radical of a mixture of fatty acids derived from tallow). Typical alkyl pyridinium halide salts are dodecyl pyridinium chloride, cetyl pyridinium and octadecyl pyridinium bromides.

The unsaturated high molecular weight alcohols, effective in improving the quality and the adhesion of the oil-in-water cationic bituminous emulsions prepared with the aid of the aforedescribed halide salts of nitrogen bases, and particularly effective in extending the "mixing time" of the emulsions upon their coming into contact with acidic (siliceous) aggregates, are employed in approximately equal proportions from 0.1 to about 1.0% by weight, based on the finished emulsion. Approximately equal concentrations of the cationic emulsifier and of the unsaturated alcohol additive in the range from 0.2 to 0.5% by weight (based on the emulsion) are preferred for most practical applications.

The unsaturated alcohols, which act by extending the mixing time, i.e., improving the stability of the cationic bituminous emulsions in accordance with the invention, need not be employed as 100% pure alcohols. For instance, organic materials, such as wool grease, wool wax (lanolin), which usually contain substantial proportions of cholesterol and other sterols and/or their ether and ester derivatives, are found likewise to be effective in extending the mixing time and delaying the breakdown of the emulsions on contact with the aggregate.

Any bituminous material emulsifiable with cationic emulsifiers such as quaternary ammonium halides, alkyl pyridinium halides, alkyl quinolinium halides, etc., for instance, natural and petroleum asphalts, air-blown or steam-refined asphalts, gilsonite, coal-tar, oil-gas tar, pitch, and the like may be employed for the preparation of the improved cationic emulsions of the present invention. Paving-grade asphalts characterized by penetrations (ASTM D–5) from about 300, or even higher, to 0, and, preferably, from about 250 to 150, represent suitable bituminous materials.

The emulsions prepared in accordance with the invention may be either rapid-setting, medium-seting, or slow-setting. They are all characterized by a high enough residue from about 50 to about 75%, preferably from about 55 to about 68%, and, consequently, are particularly suitable for use as road binders and in other paving applications.

The actual preparation of cationic emulsions of the present invention does not involve any unusual or complex procedures. Ordinarily, the predominantly water-soluble cationic quaternary nitrogen-base halide salt emulsifier is dissolved in the aqueous phase, and the predominantly oil-soluble high molecular weight unsaturated alcohol capable of prolonging the time of mixing the emulsion with the aggregate is added to the oil (bituminous) phase. Thereupon, emulsions can be formed in the conventional manner by intensive agitation of the combined two phases in a suitable piece of equipment, such as a colloid mill.

The properties of cationic bituminous emulsions prepared in accordance with the invention have been observed in a number of tests and compared: (1) with the properties of similar corresponding cationic emulsions in which the unsaturated alcohols found, in accordance with the invention, to improve the properties of the emulsion, were not added at the time of emulsification, and (2) with the properties of similar cationic emulsion where emulsifiers other than the halide salts of quaternary nitrogen bases, referred to hereinbefore, have been employed to emulsify bitumen in water. The properties so observed and compared were: viscosity, particle size, and adhesion. The adhesion was determined by means of the "Wet-Stone Coating Test." Substantially the same equipment is employed as in the ASTM Coating Test D–244. In the test, 465 grams of wet, graded siliceous aggregate is added to the pre-weighed pan, 2% by weight of water being used with the originally dry aggregate. Thereafter, 35 grams of the cationic emulsion to be tested is added to the same pan, and the contents vigorously mixed for two minutes. The time required for coating the aggregate surface is noted; in other words, note is made of the time when the emulsion begins to strip off the aggregate, while the mixture suddenly becomes quite stiff. At that time, the mixture is set aside in the pan for 30 minutes at room temperature, placing one edge of the pan at one inch elevation to facilitate drainage. After the emulsion run-off is completely drained from the mixture, and the water and solvent (if any were used) are evaporated, the residue is weighed. A good emulsion should not have a greater loss by run-off than 10% by weight of the original asphalt content in the test sample of the emulsion. The mixture which remains in the pan is then drenched with cold tap water until the overflow appears to be clear. Excess water is then drained off, and the mixture dumped on absorbent paper. The adhesion, i.e., the extent in percent of the aggregate surface still coated with asphalt, is evaluated visually. A good emulsion should have an adhesion greater than 60%.

Particle size is determined in microns by means of a microscope. The viscosity is measured in seconds Saybolt-Furol at 122° F. in accordance with the procedure recommended by ASTM for measuring the viscosity of emulsified asphalt (ASTM D–244). The emulsions for the various illustrative test runs have been prepared by emulsifying in the colloid mill 62% of a 200–300 penetration grade asphalt of Venezuelan origin (average acid number 1.0–1.25) in water to a pH of 3.5, with the aid of different cationic emulsifiers, either in the presence or in the absence of the unsaturated high molecular weight alcohol or alcohol-containing material of the invention. In the following Table I, there are tabulated the results of several illustrative series of test runs obtained with a siliceous sandstone aggregate of Pennsylvania origin.

Table I.—Comparison of Properties of Cationic Bituminous Emulsions

[Emulsion pH=3.5. Aggregate: Siliceous sandstone from White Haven, Pennsylvania]

| Run No. | Emulsifying Agent | Amt., Percent by Wt. | High Mol Wt. Unsaturated Alcohol-Containing Material | Amt., Percent by Wt. | Viscosity, SSF at 122° F. | Particle Size in Microns (Predominant) | Wet Stone Coating Test Mixing Time in seconds | Wet Stone Coating Test Adhesion in Percent |
|---|---|---|---|---|---|---|---|---|
| 1 | Cetyl Trimethyl Ammonium Bromide. | 0.3 | | | >1,000 | 3 | >120 | 50 |
| 2 | ----do---- | 0.3 | Cholesterol | 0.15 | 995 | 2 | >120 | >95 |
| 3 | ----do---- | 0.20 | | | 975 | 3 | 90 | 55 |
| 4 | ----do---- | 0.20 | Cholesterol | 0.20 | 840 | 2 | 97 | >95 |
| 5 | ----do---- | 0.10 | | | 193 | 4 | 15 | 50 |
| 6 | ----do---- | 0.10 | Cholesterol | 0.05 | 134 | 2 | 35 | 85 |
| 7 | ----do---- | 0.10 | ----do---- | 0.10 | 177 | 2 | 40 | 85 |
| 8 | Cetyl Pyridinium Chloride. | 0.15 | | | 112 | | 20 | 70 |
| 9 | ----do---- | 0.25 | Cholesterol | 0.25 | 423 | | 95 | 90 |

The results in the above table unambiguously show that the cationic bituminous emulsions prepared with the aid of the halide salts of quaternary nitrogen bases described earlier in the present specification and the high molecular weight unsaturated monohydric alcohols or materials containing the same in accordance with the invention (runs 2, 4, 6, 7, and 9) permit longer periods of mixing with the aggregate than in the case of similar emulsions prepared without the addition of the high molecular weight unsaturated alcohols (runs 1, 3, 5 and 8). Moreover, the emulsions prepared according to the invention are found to be of an excellent quality, displaying a smooth, creamy texture with an unusually small average particle size of about two microns. Likewise, the adhesion to the aggregate in all instances is observed to be unexpectedly and substantially enhanced (runs 2, 4, 6, 7 and 9) as contrasted with the adhesion observed for the material emulsified in the absence of the effective high molecular weight unsaturated alcohols. Correspondingly, the run-off tendency is minimized; for instance, the loss of asphalt by run-off observed for the emulsion in test run 2, which contained cholesterol, was reduced by at least ⅓ as compared with the loss observed for the emulsion of test run 1, in which instance the emulsion did not contain cholesterol.

In the next Table II, cationic emulsions prepared in accordance with the invention, and also similar cationic emulsions formed, however, with the aid of different emulsifiers, were tested as to their behavior on contact (mixing) with a particularly recalcitrant acidic aggregate, namely, the coarse, substantially 100% quartz, known in the trade under the name of "Bristol Silica" of Oregon origin.

Again the results appearing in Table II confirm the superiority of the cationic emulsions of this invention. The mixing periods are remarkably longer in the case of these bituminous emulsions containing unsaturated high molecular weight alcohols, e.g., wool grease, sitosterol, and cholesterol (runs 2, 3, 4 and 5). The adhesion is correspondingly improved. The superior quality of the emulsions is also evidenced by an unusually smooth, creamy texture, and by the predominance of particles of 2 microns in size, on the average. On the other hand, similarly prepared asphalt-in-water emulsions, for the preparation of which different cationic emulsifiers, such as alkyl diethylethanol ammonium chloride (run 6) and cetyl dimethyl amine (runs 7 and 8) were employed, are observed to be much coarser in texture, with particle sizes ranging from 8 to 10 microns. They could be mixed with the aggregate but for much shorter periods of time, producing a thin unsatisfactory film of asphalt or failing to coat the aggregate altogether. The specificity of the compositions is rendered evident by the fact that the emulsions prepared with the emulsifiers other than the cation-active halide salts of the nitrogen bases, stated hereinbefore to be effective for the purposes of this invention, performed poorly, even though these emulsions contained the unsaturated high molecular weight alcohol materials, e.g., oleyl alcohol (run 8) and wool grease (run 6).

The reduction of run-off, and, correspondingly, the reduction of the asphalt loss, likewise constitutes an important advantage of the present invention. In a comparison test series which employed emulsions prepared with the aid of 0.2% by weight of cetyl trimethyl ammonium bromide, as a representative cationic emulsifier

Table II.—Comparison of Properties of Cationic Bituminous Emulsions

[Emulsion pH=3.5. Aggregate: Coarse (⅜"-¾" and larger), substantially 100% silica from Oregon]

| Run No. | Emulsifying Agent | Amt., Percent by Wt. | High Mol. W. Unsaturated Alcohol Containing Materials | Amt., Percent by Wt. | Viscosity, SSF at 122° F. | Predominant Particle Size in Microns | Wet-Stone Coating Test Mixing Time in Seconds | Wet-Stone Coating Test Adhesion in Percent |
|---|---|---|---|---|---|---|---|---|
| 1 | Cetyl Trimethyl Ammonium Bromide | 0.20 | | | 975 | 3 | 40 | 80. |
| 2 | ----do---- | 0.20 | Oleyl Alcohol | 0.20 | 570 | 3 | 120 | 95. |
| 3 | ----do---- | 0.20 | Wool Grease | 0.20 | 642 | | 120 | 90. |
| 4 | Cetyl Pyridinium Chloride | 0.20 | β-Sitosterol | 0.20 | | | 95 | 90. |
| 5 | Cetyl Trimethyl Ammonium Bromide [1] | 0.20 | Cholesterol | 0.20 | | | 120 | 95. |
| 6 | Alkyl Diethylethanol Ammonium Chloride [2] | 0.20 | Wool Grease | 0.20 | 23 | 8 | 55 | 85 (Extremely thin film). |
| 7 | Cetyl Dimethylamine | 0.20 | | | 63 | 10 | No Coating | |
| 8 | ----do---- | 0.20 | Oleyl Alcohol | 0.20 | 86 | 10 | ----do---- | |

[1] Emulsion pH=4.5.
[2] Trademarked material "ADE-50" supplied by Oronite Chemical Company.

of the present invention, and in the range of pH from 4.5 to 6.5, the emulsions whose formulations included 0.2% by weight of cholesterol, as a typical operative unsaturated high molecular weight alcohol, were found to suffer a loss of asphalt that was lower by 30–55%, as compared with the loss of asphalt suffered by the emulsions which did not contain cholesterol.

It is thus seen that the cationic bituminous emulsions of the present invention possess a number of unexpected and unique advantages both from the operational standpoint and with regard to the economics of the application of these emulsions for the construction, resurfacing, and repair of roads and other paved surfaces.

The fortunate combination of the effective proportions of cationic halide salts of the particular kind of nitrogen bases described hereinbefore and the high molecular weight unsaturated monohydric alcohols, selected among the group formed by sterols, $C_{16}$–$C_{20}$ alkenols, and $C_{16}$–$C_{20}$ alkadienols, brings about a definite improvement of emulsion quality, enhances emulsion stability and permits a much longer contact while mixing the emulsion with the aggregate prior to breaking down. This facilitates formation of a more thorough, thicker and more adherent film of bitumen (asphalt) on the aggregate.

On the side of economics, the presence of this combination in the emulsion formulation dispenses with the onerous step of re-running partly broken down emulsions through the colloid mill, and the consequent necessity of using greater quantities of the emulsifier. In addition, the presence of this combination in the emulsion significantly reduces the loss of the bituminous binder by run-off, which fact represents a substantial saving for the contractor or applicator. Moreover, as pointed out hereinbefore, the effective high molecular weight unsaturated alcohol component of the emulsion need not be present therein in the pure state; for instance, sterols need not be employed as a particular individual 100% pure sterol, but instead much less expensive organic materials containing mixtures of sterols and their ester and ether derivatives, such as wool grease or lanolin, can be employed with substantially equal success.

It is to be noted that, in addition to the four essential components of the cationic bituminous emulsions of the invention, namely, bitumen, water, the cationic emulsifier from the particular class of effective halide salts of quaternary nitrogen bases, and the effective unsaturated high molecular weight monohydric alcohol component, these emulsions may also contain conventional additives known in the art to enhance certain desirable characteristics of emulsions. These additives include: antistripping agents, thickening agents, diluents or solvents, such as naphthenic or aromatic petroleum hydrocarbon thinners usually added to facilitate handling or mixing with the aggregate, etc., provided that these various additives are employed in such amounts as not to impair the improvement in emulsifying properties, the excellent adhesion and other desirable valuable characteristics of the emulsions of the present invention.

It is, of course, to be understood that the invention is not to be limited by the foregoing description and the disclosures of the specific examples given hereinabove in this specification solely to illustrate the invention. Therefore, all possible modifications thereof coming within the scope and spirit of the following claims shall be embraced thereby.

I claim:

1. An oil-in-water type cationic bituminous emulsion characterized by reduced run-off and improved adhesion of bituminous binder to electronegative stone aggregate which consists essentially of from about 50 to about 75% by weight of bitumen, as the disperse phase; from 0.1 to about 1% by weight of a cation-active halide salt of an organic nitrogen base, as the sole emulsifier for said bitumen, said halide salt being selected from the group consisting of quaternary ammonium halides and halide salts of quaternary heterocyclic nitrogen bases, the cation portion of which contains only nitrogen, carbon and hydrogen atoms; from 0.1 to about 1% by weight of a high molecular weight unsaturated monohydric alcohol selected from the group consisting of sterols, $C_{16}$–$C_{20}$ alkenols, and $C_{16}$–$C_{20}$ alkadienols; and water, as the continuous phase, to make up 100% by weight of the emulsion.

2. An oil-in-water type cationic bituminous emulsion characterized by reduced run-off and improved adhesion of bituminous binder to electronegative stone aggregate which consists essentially of from about 55 to about 68% by weight of bitumen, as the disperse phase; from 0.2 to 0.5% by weight of a cation-active halide salt of an organic nitrogen base, as the sole emulsifier for said bitumen, said halide salt being selected from the group consisting of quaternary ammonium halides and halide salts of quaternary heterocyclic nitrogen bases, the cation portion of which contains only nitrogen, carbon and hydrogen atoms; from 0.2 to 0.5% by weight of a high molecular weight unsaturated monohydric alcohol selected from the group consisting of sterols, $C_{16}$–$C_{20}$ alkenols, and $C_{16}$–$C_{20}$ alkadienols; and water, as the continuous phase, to make up 100% by weight of the emulsion.

3. An emulsion as defined in claim 1 wherein said halide salt emulsifier is a chloride salt.

4. An emulsion as defined in claim 1 wherein said halide salt emulsifier is a bromide salt.

5. An emulsion as defined in claim 1 wherein said high molecular weight unsaturated monohydric alcohol is a sterol.

6. An emulsion as defined in claim 1 wherein said high molecular weight unsaturated monohydric alcohol is cholesterol.

References Cited in the file of this patent

UNITED STATES PATENTS

| 1,778,760 | Hay | Oct. 21, 1930 |
| 1,973,991 | McKesson et al. | Sept. 18, 1934 |
| 2,378,235 | Miles | June 12, 1945 |

FOREIGN PATENTS

| 233,430 | Great Britain | May 8, 1925 |